United States Patent
Adolfsen et al.

(10) Patent No.: US 7,602,763 B2
(45) Date of Patent: Oct. 13, 2009

(54) DISTRIBUTION OF FRAME SYNCHRONIZATION INFORMATION AT BASE STATION

(75) Inventors: Pekka Adolfsen, Oulu (FI); John Beale, Berkshire (GB)

(73) Assignee: Nokia Corporation, Espoo (FI)

(*) Notice: Subject to any disclaimer, the term of this patent is extended or adjusted under 35 U.S.C. 154(b) by 820 days.

(21) Appl. No.: 10/441,250

(22) Filed: May 20, 2003

(65) Prior Publication Data
US 2004/0190559 A1    Sep. 30, 2004

(30) Foreign Application Priority Data
Mar. 31, 2003   (FI)   ................... 20030477

(51) Int. Cl.
H04B 7/212   (2006.01)
H04J 3/06    (2006.01)
H04Q 11/00   (2006.01)

(52) U.S. Cl. .............. 370/350; 370/324; 370/347; 370/503

(58) Field of Classification Search ........ 370/324, 370/350, 347, 320, 335, 342, 328, 362, 503, 370/509–514; 375/354, 356; 455/502
See application file for complete search history.

(56) References Cited

U.S. PATENT DOCUMENTS

| | | | |
|---|---|---|---|
| 4,796,282 A * | 1/1989 | Yoshida | 375/368 |
| 5,832,366 A * | 11/1998 | Umetsu | 340/7.38 |
| 5,940,384 A | 8/1999 | Carney et al. | |
| 6,088,350 A * | 7/2000 | Kagaya | 370/347 |
| 6,275,519 B1 * | 8/2001 | Hendrickson | 375/138 |
| 6,282,184 B1 | 8/2001 | Lehman et al. | |
| 7,047,011 B1 * | 5/2006 | Wikman | 455/442 |

FOREIGN PATENT DOCUMENTS

| | | | |
|---|---|---|---|
| WO | WO 00/21246 | * | 4/2000 |
| WO | WO 02/104050 A1 | | 12/2002 |

\* cited by examiner

*Primary Examiner*—Patrick N. Edouard
*Assistant Examiner*—Michael T Thier
(74) *Attorney, Agent, or Firm*—Squire, Sanders & Dempsey L.L.P.

(57) ABSTRACT

A method and system distributes frame synchronization information at a base station implementing air interfaces of at least two different standards and to a base station implementing air interfaces of at least two different standards. Frame synchronization information is generated in a clock unit for at least two air interface standards. Synchronization bursts containing the frame synchronization information are transferred from the clock unit to processing units over a serial bus using time-division multiplexing for synchronization bursts addressed to the processing units of different air interface standards. The frame synchronization information is extracted in each processing unit from the received synchronization burst of its respective air interface standard.

42 Claims, 3 Drawing Sheets

DISTRIBUTION OF FRAME SYNCHRONIZATION INFORMATION AT BASE STATION

BACKGROUND OF THE INVENTION

1. Field of the Invention

The invention relates to a method for distributing frame synchronization information at a base station implementing air interfaces of at least two different standards and to a base station implementing air interfaces of at least two different standards.

2. Description of the Related Art

A base station, or base transceiver station, or node B (a term used by the European Telecommunications Standards Institute, ETSI) is a network element in a mobile network responsible for radio transmission and reception to or from the mobile station. The base station provides the transceiver functions of the base station system. One base station may include one or more transceivers. In third generation networks, the base station terminates an Iub interface towards a radio network controller (RNC).

Traditional base stations only implement an air interface of a certain standard, such as GSM (Global System for Mobile Communications) or UMTS (Universal Mobile Telecommunications System). In such base stations the distribution of frame synchronization information usually utilizes a continuous frame clock signal in a bus. The distribution is relatively unproblematic to implement as frame synchronization information of only one standard is transferred in the bus.

However, nowadays base stations that implement simultaneous air interfaces of at least two different standards are becoming more common. The distribution of frame synchronization information at such 'multi-standard' base stations is much more complicated than at a traditional base station.

SUMMARY OF THE INVENTION

The invention seeks to provide an improved method for distributing frame synchronization information in a base station implementing air interfaces of at least two different standards.

According to an embodiment of the invention, there is provided a method for distributing frame synchronization information at a base station implementing air interfaces of at least two different standards. The method includes: generating frame synchronization information for at least two air interface standards in a clock unit; transferring synchronization bursts containing the frame synchronization information from the clock unit to processing units over a serial bus using time-division multiplexing for synchronization bursts addressed to processing units of different air interface standards; and extracting in each processing unit the frame synchronization information from a received synchronization burst of its respective air interface standard.

The invention also seeks to provide an improved base station implementing air interfaces of at least two different standards.

According to another embodiment of the invention, there is provided a base station implementing air interfaces of at least two different standards. The base station includes: a clock unit, configured to generate frame synchronization information for at least two air interface standards; processing units of different air interface standards, each configured to extract the frame synchronization information from a received synchronization burst of its respective air interface standard; and a serial bus connecting the clock unit and the processing units, configured to transfer the synchronization bursts containing the frame synchronization information from the clock unit to processing units using time-division multiplexing for synchronization bursts addressed to the processing units of different air interface standards.

The invention provides several advantages. For example, only one serial bus for frame synchronization information is needed even in a multi-standard base station. Usage of time division multiplexing and bursts, i.e. non-continuous signals, reduces interference caused to other signals. The solution is also future-proof; there is no need to alter the synchronization bus structure in the future as processing units of some new standard emerge.

BRIEF DESCRIPTION OF THE DRAWINGS

In the following, the invention will be described in greater detail with reference to the preferred embodiments and the accompanying drawings, in which.

DETAILED DESCRIPTION OF THE PREFERRED EMBODIMENTS

Figure 1:
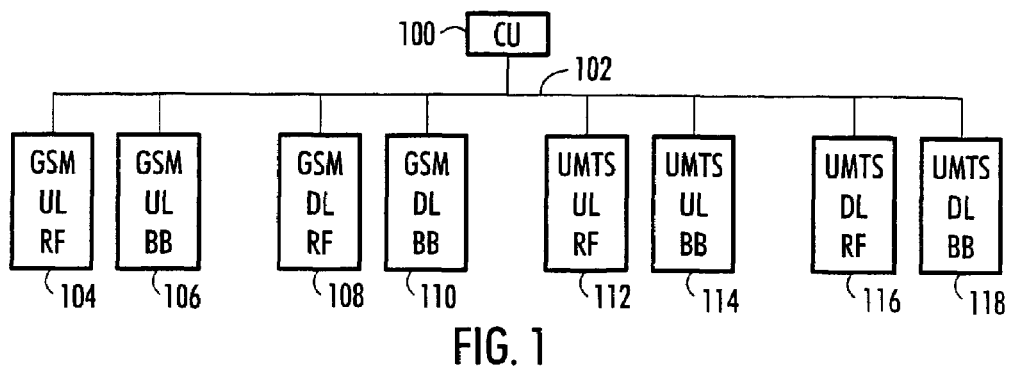
FIG. 1 is a simplified block diagram illustrating a clock unit, serial bus and processing units of a base station.

With reference to FIG. 1, an example of a base station structure is discussed. The base station implements air interfaces of at least two different standards, and therefore it includes processing units 104, 106, 108, 110, 112, 114, 116, 118 of different air interface standards.

The standard here refers to any air interface standards that have different frame synchronization requirements. Examples of such standards include GSM, which represents the second-generation radio systems, a GSM-based radio system, which employs EDGE (Enhanced Data Rates for Global Evolution) technology for increasing the data transmission rate and which can also be used for implementing packet transmission in a GPRS (General Packet Radio System) system, which represents the 2.5-generation radio systems, and a radio system known at least as IMT-2000 (International Mobile Telecommunications 2000) and UMTS (Universal Mobile Telecommunications System) employing WCDMA (Wideband Code Division Multiple Access) technology, which represents the third-generation radio systems. The embodiments are, however, not restricted to these systems, but a person skilled in the art can also apply the embodiments to other radio systems that can utilize multi-standard base stations.

In our example the air interface standards are GSM and UMTS. The processing units 104, 106, 108 and 110 are in accordance with the GSM standard and the processing units 112, 114, 116 and 118 are in accordance with the UMTS standard.

The base station requires an accurate clock signal to guarantee high frequency stability and accurate timing on the air interface. This high accuracy can be achieved by conveying a clock signal from a national reference clock as a pulse train along the national telephone backbone, along the radio system infrastructure, e.g. a mobile switching center (MSC), base station controller (BSC), or radio network controller (RNC) up to the base stations. Also other atomic clocks or a GPS (Global Positioning System) clock can be used as a source for an accurate clock signal. A clock unit 100 of the base station is configured to generate frame synchronization information for at least two air interface standards. A clock unit 100 can be such that it maintains both the system clock and the frame clock, or it can only maintain the frame clock, whereupon the system clock is maintained in another unit. The clock unit 100 can also be combined into some other unit, such as the main control unit of the base station. In an embodiment the clock unit 100 is configured to generate a frame clock for the frame synchronization information.

In an embodiment the clock unit 100 is configured to generate a frame number for the frame synchronization information. A GSM TDMA (Time Division Multiple Access) frame includes eight time slots each having a length of 577 microseconds and therefore the length of one frame is 8×577 microseconds=4.616 milliseconds. One GSM hyper frame includes 2715648 frames, thus the frame number runs from the beginning to the end in 3 h 28 minutes and 53.760 seconds. A UMTS frame includes fifteen time slots each having a length of 666 microseconds, and in UMTS the system frame number (SFN) is a 12-bit number. The frame number is used by several procedures, such as processing of base band and radio frequency signals that span more than a single frame.

The base station also includes a serial bus 102 connecting the clock unit 100 and the processing units 104, 106, 108, 110, 112, 114, 116, 118. The serial bus 102 is configured to transfer the synchronization bursts containing the frame synchronization information from the clock unit 102 to processing units 104, 106, 108, 110, 112, 114, 116, 118 using time-division multiplexing for synchronization bursts addressed to processing units of different air interface standards. This means that synchronization bursts of the GSM standard are addressed to processing units 104, 106, 108 and 110, whereas synchronization bursts of the UMTS standard are addressed to processing units 112, 114, 116 and 118. Time division multiplexing is a digital transmission technique in which several signals are interleaved in time for transmission over a common channel, i.e. in our example, the synchronization bursts are interleaved in time for transmission over the common serial bus 102.

Processing units 104, 106, 108, 110, 112 114, 116, 118 of different air interface standards are each configured to extract the frame synchronization information from a received synchronization burst of its respective air interface standard. Thus processing units 104, 106, 108 and 110 each extract synchronization information from the synchronization bursts of the GSM standard and processing units 112, 114, 116 and 118 each extract synchronization information from the synchronization bursts of the UMTS standard.

The distribution of the frame synchronization information can be performed during the start-up of the base station, on demand, and/or at predetermined time intervals. In an embodiment the clock unit 100 is configured to perform the frame synchronization information distribution on demand. In an embodiment, the processing unit 104, 106, 108, 110, 112, 114, 116, 118 is configured to demand the frame synchronization information from the clock unit 100. Processing unit 104, 106, 108, 110, 112, 114, 116, 118 can be configured to make the demanding during the start-up of the processing unit. In an embodiment the clock unit 100 is configured to perform the frame synchronization information distribution during the start-up of the base station.

The clock unit 100 is configured to perform the frame synchronization information distribution to processing units 104, 106, 108, 110, 112, 114, 116, 118 by broadcasting (unidirectional distribution to several users) or multicasting. Multicasting can be defined as broadcasting to a sub-set of processing units, i.e. it may necessitate the use of a router in the serial bus 102. There is thus a point-to-multipoint connection between the clock unit 100 and the processing units. Inside the processing unit, point-to-point connections can be used, as will be explained below.

The processing units presented in FIG. 1 can be specified as follows: a radio frequency receiver unit 104 of the GSM standard for uplink reception, a base band processing unit 106 of the GSM standard for uplink detection, decoding and deciphering, a radio frequency transmitter unit 108 of the GSM standard for downlink transmission, a base band processing unit 110 of the GSM standard for downlink coding and ciphering, a radio frequency receiver unit 112 of the UMTS standard for uplink reception, a base band processing unit 114 of the UMTS standard for uplink detection, a radio frequency transmitter unit 116 of the UMTS standard for downlink transmission, and a base band processing unit 118 of the UMTS standard for downlink coding and modulation. With uplink we mean direction of transmission in which the mobile station transmits and the base station receives. Downlink is then the opposite direction of transmission.

Figure 2:
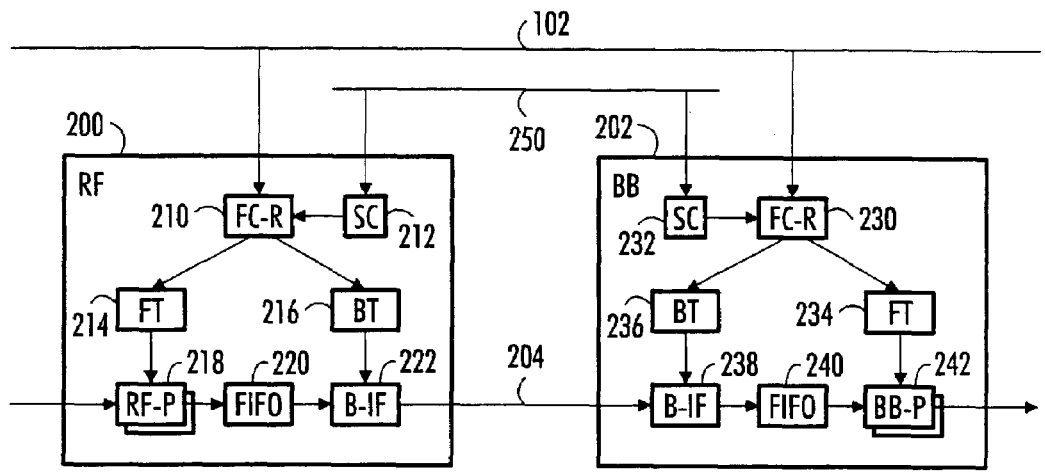
FIG. 2 illustrates internal structures of two different processing units, namely a radio frequency receiver unit and base band processing unit.

Next, with reference to FIG. 2 internal structures of two different processing units, namely a radio frequency receiver unit 200 and a base band processing unit 202, are described. The radio frequency receiver unit 200 as well as the base band processing unit 202 include frame clock receivers 210, 230 that receive the synchronization bursts from the serial bus 102. The processing units 200, 202 also include a system clock 212, 232. The system clock 212, 232 receives timing information over a bus 250. The timing information may be a continuous frequency reference. In an embodiment the clock unit 100 is configured to distribute to the processing units 200, 202 a system clock that is phase-locked with the frame clock. The processing unit 200, 202, in turn, may be configured to sample the serial bus 102 with a sampling rate derived from the system clock 212, 232. This inter-synchronization between the frame clock and the system clock makes it easier to implement the frame synchronization information distribution with sufficiently good timing precision.

In an embodiment the processing unit 200, 202 is configured to utilize the extracted frame synchronization information for air interface frame synchronization between different processing units 200, 202 of one air interface standard. In the example of FIG. 2, both the radio frequency receiver unit 200 and the base band processing unit 202 include frame timing blocks 214, 234 which utilize the extracted frame synchronization information for air interface frame synchronization. As illustrated in FIG. 2, the radio frequency receiver unit 200 includes radio frequency processing blocks 218 controlled by the frame timing block 214, and the base band processing unit 202 includes base band processing blocks 242 controlled by the frame timing block 234. The radio frequency processing blocks 218 utilize the frame timing reference while packaging uplink samples into bus messages. The messages utilize a time stamp, which carries air interface timing information to the base band processing blocks 242.

In an embodiment the processing unit 200, 202 is configured to utilize the extracted frame synchronization information for bus 204 synchronization between different processing units 200, 202 of one air interface standard. As illustrated in FIG. 2, both processing units 200, 202 include bus timing blocks 216, 236 which control the bus interfaces 222, 238 at both ends of the bus 204.

Normally, the processing units 200, 202 are configured to generate independent synchronization information locked to the extracted synchronization information, i.e. frame timing blocks 214, 234 and bus timing blocks 216, 236 maintain synchronization information independently. It is to be noted that frame timing blocks 214, 234 and bus timing blocks 216, 236 may maintain synchronization information commonly. A single block implementing both the frame timing block 214, 234 and the bus timing block 216, 236 is also possible. Counters can be used in the frame timing blocks 214, 234 for generation of frame numbers.

There can be a FIFO block (First In First Out, i.e. a queuing discipline in which arriving entities are handled in their order of arrival) 220 between radio frequency processing blocks 218 and the bus interface 222, and a FIFO block 240 between the bus interface 238 and base band processing blocks 242. Circular buffers that maintain both read and write addresses can implement the FIFO blocks 220, 240.

Figure 3:
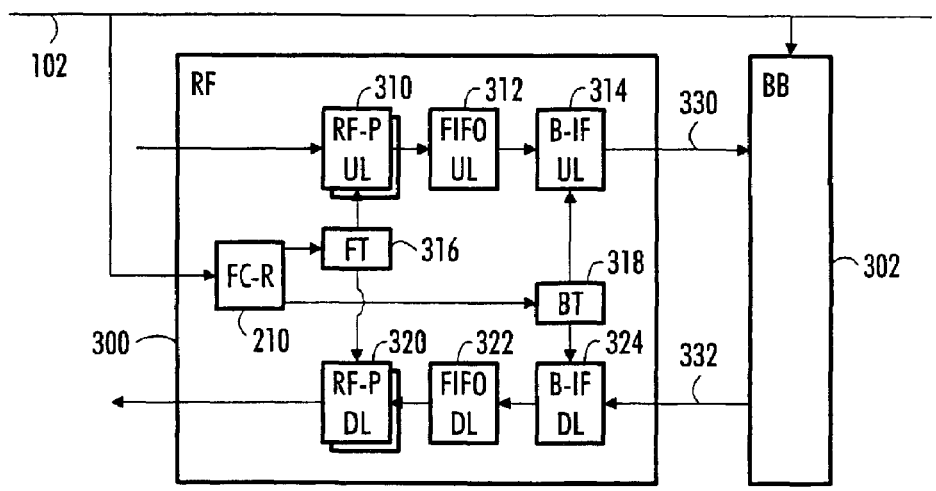
FIG. 3 illustrates the internal structure of a radio frequency processing unit processing both uplink and downlink directions.

Embodiments having separate processing units for uplink and downlink directions were presented in FIGS. 1 and 2. However, a processing unit processing both uplink and downlink directions is also possible. With reference to FIG. 3, the internal structure of such a processing unit 300 is described. The processing unit 300 is a radio frequency transceiver unit, but the same principle can also be applied to a base band processing unit 302 (although its internal structure is not described here for the sake of clarity). The processing unit 300 includes one frame clock receiver 210 that receives synchronization bursts over the serial bus 102. The frame clock receiver distributes the received synchronization information to a frame timing block 316 and to a bus timing block 318. The frame timing block 316 controls the frame synchronization in both uplink radio frequency processing blocks 310 and downlink radio frequency processing blocks 320. The bus timing block 318 also controls the bus synchronization of both an uplink bus interface 314 and a downlink bus interface 324. The uplink bus interface 314 transmits to the uplink bus 330, and the downlink bus interface 324 receives from the downlink bus 332. Both link directions have separate FIFO blocks 312, 322.

Figure 4:
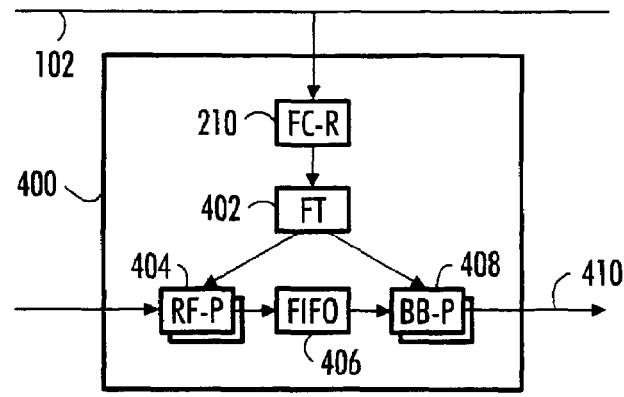
FIG. 4 illustrates the internal structure of a special unit processing both radio frequency data and base band data.

In an embodiment illustrated in FIG. 4, the processing units relating to an air interface standard include radio frequency transceiver blocks 404 and base band processing blocks 408, and the blocks are included in one special unit 400 of the base station. The special unit 400 processes both radio frequency data and base band data. The special unit 400 also includes the frame clock receiver 210 and frame timing block 402, but it does not necessarily need the bus timing block, depending, of course, on the timing requirements of the output signals sent to the bus 410. The special unit 400 may need a FIFO block 406 between the radio frequency transceiver blocks 404 and base band processing blocks. The special unit 400 of FIG. 4 is for uplink direction, but also a special unit designed for downlink direction is possible. A special unit incorporating features of FIGS. 3 and 4 is also possible; such special unit would then have both radio frequency transceiver blocks and base band processing blocks for uplink and downlink directions.

Figure 7:
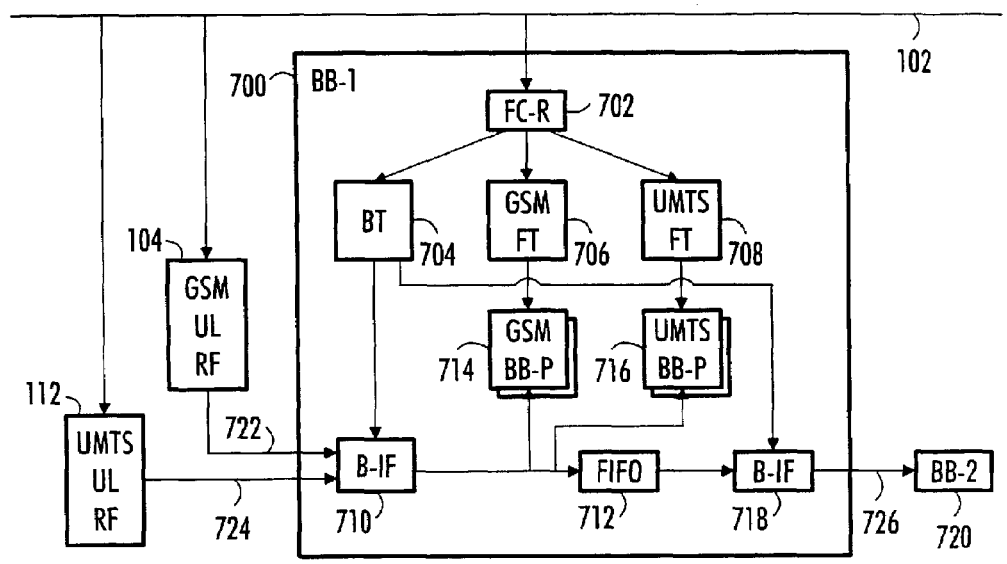
FIG. 7 illustrates the internal structure of a multi-standard processing unit.

In an embodiment of FIG. 7, the internal structure of a multi-standard processing unit is illustrated. Processing units of two different air interface standards are included in one multi-standard unit of the base station. In our example the multi-standard processing unit is a base band processing unit 700 capable of processing both base band signals obtained from the GSM uplink radio frequency receiver unit 104 and base band signals obtained from the UMTS uplink radio frequency receiver unit 112.

The base band processing unit 700 includes a frame clock receiver 702, which receives the synchronization bursts of both a GSM air interface standard and a UMTS air interface standard over the serial bus 102. The base band processing unit 700 includes a bus timing block 704, GSM frame timing block 706, and UMTS frame timing block 708. The base band processing unit 700 further includes both GSM base band processing blocks 714 controlled by the GSM frame timing block 706 and UMTS base band processing blocks 716 controlled by the UMTS frame timing block 708. The bus timing block 704 controls both bus interface 710 for the incoming buses 722 and 724 and bus interface 718 for the outgoing bus 726. The incoming bus interface 710 is capable of handling both GSM and UMTS base band signals. In our example, there is also a FIFO block 712 capable of queuing both GSM and UMTS base band signals between the incoming bus interface 710 and the base band processing blocks 714, 716.

FIG. 7 also illustrates an embodiment where base band processing capacity is distributed among several serially connected base band processing units. In our example, the required base band functionality is divided between two base band processing units 700, 720 connected by the bus 726. The same principle can also be exploited for the radio frequency processing units.

The clock unit 100 and processing unit 104, 106, 108, 110, 112, 114, 116, 118, with all the variations shown in FIGS. 1 to 4 and 7, are each usually implemented with one or more application-specific integrated circuits (ASIC) placed on a circuit board. The units may also include other hardware parts, such as microprocessors and other integrated circuits, for example clock circuits and bus interfaces. Some functions can also be implemented with software that is run in a microprocessor. The building blocks thus include hardware components, ASIC blocks, and software modules. In selecting the implementation mix, a person skilled in the art will take into consideration for instance the requirements set on the size and power consumption of the device, the required processing power, manufacturing costs and production volumes.

Next, an example of the implementation of the frame timing block 214, 234 and the bus timing block 216, 236 will be presented. Each block maintains an internal 'Mode' register and 'State' register. The operation on receiving a synchronization burst depends on the 'Mode' and 'State' registers as follows:

IF 'Mode' in burst=ASIC Block mode

THEN

```
    IF 'State' = Synchronized
    THEN do 'Compare' Operation
        IF Compare result is 'Not OK',
        THEN
            set 'State' to 'Not Synchronized'
            result register = 'Compare Not OK'
    ELSE
            result register = 'Compare OK'
                END IF Compare
        ELSE
            IF Control is 'Synchronize',
                do 'Synchronize' Operation
```

-continued

```
            set 'State' to 'Synchronized'
    END IF Control
        END IF State
    ELSE
        Do Nothing
    END IF Mode
```

Note that 'Compare' will return 'OK' if synchronization is correct within some limit, for example within ±1 or ±2 ASIC clock periods. The 'State' register will be set to 'Not Synchronized' by an ASIC power-up and by the 'Compare' operation returning 'Compare Not OK' as its result.

Figure 5:
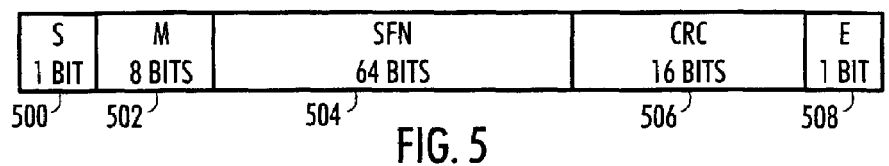
FIG. 5 illustrates an example of a synchronization burst structure.

FIG. 5 illustrates an example of the structure of a synchronization burst. The numbers within the parts are given as examples of the bit sizes of the parts. The clock unit 100 is configured to insert in the synchronization bursts a start part 500, a mode part 502 indicating whether the synchronization bursts is intended for frame synchronization of a certain air interface standard or for bus synchronization, and an end part 508. In an embodiment the synchronization burst also includes a system frame number 504. In an embodiment the synchronization burst also includes an error detection code 506. The described non-continuous synchronization burst could be 90 bits long. If the serial bus 102 uses a rate of 3.84 megabits/second, the synchronization burst is 25 microseconds long.

The start part 500 indicates that a new synchronization burst will be coming. In our example, at least 89 consecutive zeros are needed before the start bit can be recognized.

Each processing unit 104, 106, 108, 110, 112, 114, 116, 118, or more precisely each frame clock receiver 210, 230 of the unit, receives only those synchronization bursts that are intended for it, based on the mode part 502. Synchronization bursts of other modes are ignored. The mode part 502 begins with the LSB (Least Significant Bit). When the processing unit is implemented with the ASIC technology, the mode of an ASIC block is maintained in a register and the value of this register is compared to the received mode part 502.

The system frame number 504 begins with the end bits, i.e. the LSB bit comes first, and unused bits have the value zero. In the bus synchronization mode there is no frame number, and hence all bits have value zero. In the UMTS/FDD mode there is a 12-bit frame number. UMTS/TDD mode is to be defined. In the GSM/EDGE mode there are the following values: T1 (11-bits 0-10), T2 (5 bits 11-15) and T3 (6 bits 16-21). In the CDMA2000 mode, the system time is in 20 millisecond frames (33 bits). For other modes the bits are to be defined.

CRC (Cyclic Redundancy Check) can be used, for example with a generator polynomial $x^{16}+x^{12}+x^5+1$, as an error detection code 506. CRC 506 is calculated over the mode part 502 and the system frame number 504. CRC 506 is sent with the LSB first.

The end part 508 indicates that the synchronization burst is ending. In an embodiment, the processing unit 104, 106, 108, 110, 112, 114, 116, 118 is configured to change the frame number at a predetermined offset to a predetermined point of the synchronization burst. The predetermined point may be for example the end of the synchronization burst. The predetermined offset can also have the value zero.

Next, some examples of the values of the data rates and clock frequencies are given: The data rate in the serial bus 102 is 3.84 megabits/second clocked out at the clock unit 100 with a 19.2 MHz (megahertz) clock. Each processing unit re-clocks/samples the serial bus 102 with the received 19.2 MHz system clock. The ASIC blocks of the processing units can clock/sample the serial bus 102 with their 76.8 internal ASIC clocks, provided that the ASIC clock speed is 76.8 MHz. The ASIC block will then take the falling edge (as re-clocked by the ASIC clock) of the end part 508 to denote the exact frame boundary time.

In Table 1 (FDD=Frequency Division Duplex, TDD=Time Division Duplex, IS-95=a second generation code division multiple access standard elaborated by Telecommunications Industry Association), some examples of values for the mode part 502 where the bit values are expressed in hexadecimal numbers.

TABLE 1

| Mode | Bits |
| --- | --- |
| Not used | 00h |
| Bus synchronization | 01h |
| UMTS/FDD | 02h |
| GSM/EDGE | 03h |
| UMTS/TDD | 04h |
| IS-95 CDMA | 05h |
| Spare | 06h to FFh |

Figure 6:
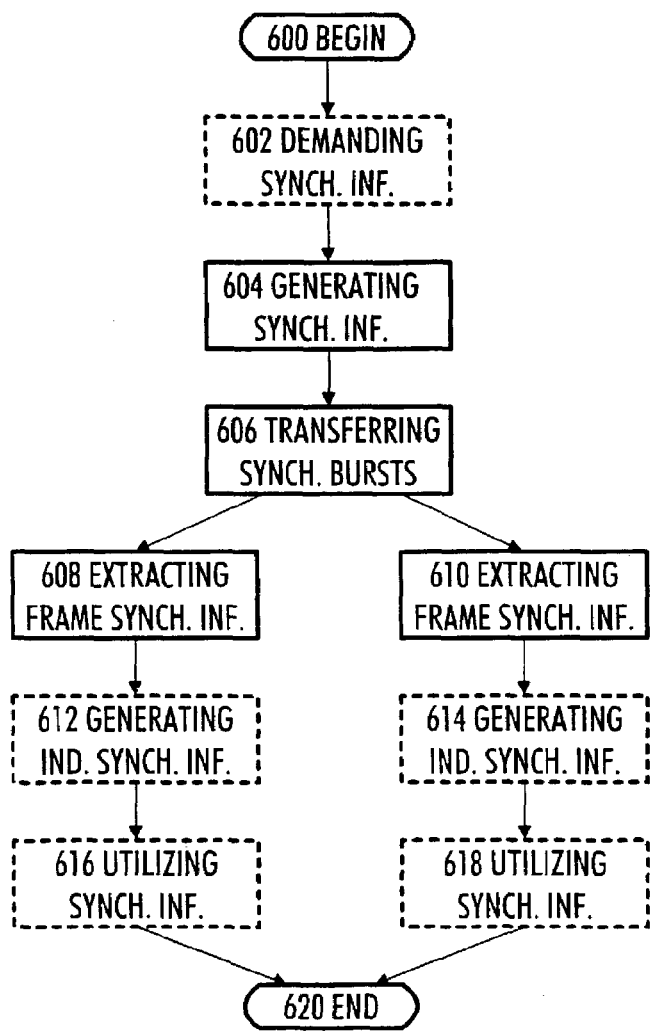
FIG. 6 is a flow diagram illustrating a method for distributing frame synchronization information at a base station implementing air interfaces of at least two different standards.

Next, with reference to FIG. 6, a method for distributing frame synchronization information at a base station implementing air interfaces of at least two different standards is discussed. The described method can be realized by using the technology described above, but also other kinds of implementations are possible.

The execution of the method starts at 600. In an embodiment, the frame synchronization information distribution is performed during the start-up of the base station. In another embodiment, illustrated by 602, the frame synchronization information distribution is performed on demand. In an embodiment the processing unit demands the frame synchronization information from the clock unit. In an embodiment, the demanding is made during the start-up of the processing unit. The demanding can also be made during the normal operation of the processing unit, for example at regular time intervals, or after the processing unit has detected a need to correct synchronization. In an embodiment the frame synchronization information distribution is performed at predetermined time intervals, without any specific messages.

The frame synchronization information is generated 604 in a clock unit for at least two air interface standards.

In an embodiment, in the synchronization burst is inserted a start part, a mode part indicating whether the synchronization burst is intended for frame synchronization of a specific air interface standard or for bus synchronization, and an end part. In an embodiment, in the synchronization burst is inserted a system frame number. In an embodiment, in the synchronization burst is inserted an error detection code.

In an embodiment, a frame clock is generated for the frame synchronization information.

In an embodiment, a frame number is generated for the frame synchronization information.

In an embodiment, the frame number is changed at a predetermined offset to a predetermined point of the synchronization burst. The frame number can therefore be changed at the end of the synchronization burst.

Then the synchronization bursts containing the frame synchronization information are transferred 606 from the clock unit to processing units over a serial bus using time-division multiplexing for synchronization bursts addressed to processing units of different air interface standards.

Finally, the frame synchronization information is extracted 608, 610 in each processing unit from the received synchronization burst of its respective air interface standard.

The method ends at 620.

In an embodiment, in the processing unit is generated 612, 614 independent synchronization information locked to the extracted synchronization information.

In an embodiment, the extracted frame synchronization information is utilized 616, 618 for air interface frame synchronization between different processing units of one air interface standard. In another embodiment, the extracted frame synchronization information is utilized for bus synchronization between different processing units of one air interface standard.

In an embodiment, a system clock that is phase-locked with the frame clock is distributed to the processing units, and the serial bus is sampled with a sampling rate derived from the system clock.

Even though the invention is described above with reference to an example according to the accompanying drawings, it is clear that the invention is not restricted thereto but it can be modified in several ways within the scope of the appended claims. For the skilled person it is clear that the embodiments described in the Figures can be combined with each other in order to arrive at new embodiments.

What is claimed is:

1. A method, comprising:
   generating frame synchronization information for at least two air interface standards in a clock;
   generating a system frame number for the frame synchronization information;
   transferring synchronization bursts containing the frame synchronization information from the clock to processors over a serial bus using time-division multiplexing for synchronization bursts addressed to processors of different air interface standards;
   extracting, in at least one processor, the frame synchronization information from a received synchronization burst of a respective air interface; and
   changing, in the at least one processor, the frame number at a predetermined offset to a predetermined point of the received synchronization burst,
   wherein the generating of the frame synchronization information, the generating of the system frame number, the transferring of the synchronization bursts, and the extracting of the frame synchronization information are performed in a base station.

2. The method of claim 1, further comprising:
   utilizing the extracted frame synchronization information for air interface frame synchronization between different processors of at least one air interface standard.

3. The method of claim 1, further comprising:
   utilizing the extracted frame synchronization information for bus synchronization between different processors of at least one air interface standard.

4. The method of claim 1, further comprising:
   generating, in the at least one processor, independent synchronization information locked to the extracted synchronization information.

5. The method of claim 1, further comprising:
   performing a frame synchronization information distribution on demand.

6. The method of claim 1, further comprising:
   demanding, by the at least one processor, the frame synchronization information from the clock.

7. The method of claim 6, further comprising:
   performing the demanding during a start-up of the processor.

8. The method of claim 1, further comprising:
   performing a frame synchronization information distribution during a start-up of a base station.

9. The method of claim 1, further comprising:
   performing a frame synchronization information distribution at predetermined time intervals.

10. The method of claim 1, further comprising:
    performing a frame synchronization information distribution to the processors by broadcasting or multicasting.

11. The method of claim 1, further comprising:
    inserting, in at least one synchronization burst, a start part, a mode part indicating whether the at least one synchronization burst is intended for frame synchronization of a specific air interface standard or for bus synchronization, and an end part.

12. The method of claim 11, further comprising:
    inserting, in the at least one synchronization burst, a system frame number.

13. The method of claim 11, further comprising:
    inserting, in the at least one synchronization burst, an error detection code.

14. The method of claim 1, further comprising:
    generating, for the frame synchronization information, a frame clock.

15. The method of claim 1, further comprising:
    providing the processors for at least one air interface standard comprising a radio frequency transceiver and a base band processor.

16. The method of claim 1, further comprising:
    providing the processors for at least one air interface standard comprising radio frequency transceiver blocks and base band processing blocks; and
    including the radio frequency transceiver blocks and the base band processing blocks in at least one special unit of a base station.

17. The method of claim 1, further comprising: including processors of two different air interface standards in at least one multi-standard unit of a base station.

18. A method, comprising:
    generating frame synchronization information for at least two air interface standards in a clock;
    generating, for the frame synchronization information, a frame clock;
    generating a system frame number for the frame synchronization information;
    transferring synchronization bursts containing the frame synchronization information from the clock to processors over a serial bus using time-division multiplexing for synchronization bursts addressed to processors of different air interface standards;
    extracting, in at least one processor, the frame synchronization information from a received synchronization burst of a respective air interface standard;
    changing, in the processor, the frame number at a predetermined offset to a predetermined point of the received synchronization burst;
    distributing, to the processor, a system clock that is phase-locked with the frame clock; and
    sampling the serial bus with a sampling rate derived from the system clock,
    wherein the generating of the frame synchronization information, the generating of the system frame number, the transferring of the synchronization bursts, and the extracting of the frame synchronization information are performed in a base station.

19. An apparatus, comprising:
a clock configured to generate frame synchronization information for at least two air interface standards, wherein the clock is further configured to generate a system frame number for the frame synchronization information;
processors of different air interface standards, at least one of the processors configured to extract the frame synchronization information from a received synchronization burst of a respective air interface standard and to change the frame number at a predetermined offset to a predetermined point of the received synchronization burst; and
a serial bus configured to connect the clock and the processor, and also configured to transfer the synchronization burst containing the frame synchronization information from the clock to the processor using time-division multiplexing for the synchronization burst addressed to the processors of different air interface standards,
wherein the clock, the processors, and the serial bus are located in a base station.

20. The apparatus of claim 19, wherein:
at least one processor is configured to utilize the extracted frame synchronization information for air interface frame synchronization between different processor of at least one air interface standard.

21. The apparatus of claim 19, wherein:
at least one processor is configured to utilize the extracted frame synchronization information for bus synchronization between different processors of one air interface standard.

22. The apparatus of claim 19, wherein:
at least one processor is configured to generate independent synchronization information locked to the extracted synchronization information.

23. The apparatus of claim 19, wherein:
the clock is configured to perform the frame synchronization information distribution on demand.

24. The apparatus of claim 19, wherein:
at least one processor is configured to demand the frame synchronization information from the clock.

25. The apparatus of claim 24, wherein:
at least one processor is configured to make the demand during a start-up of the at least one processor.

26. The apparatus of claim 19, wherein:
the clock is configured to perform a frame synchronization distribution during a start-up of a base station.

27. The apparatus of claim 19, wherein:
the clock is configured to perform a frame synchronization information distribution at predetermined time intervals.

28. The apparatus of claim 19, wherein:
the clock is configured to perform a frame synchronization information distribution to the processors by broadcasting or multicasting.

29. The apparatus of claim 19, wherein:
the clock is configured to insert, in the synchronization burst, a start part, a mode part indicating whether the synchronization burst in intended for frame synchronization of a certain air interface standard or for bus synchronization, and an end part.

30. The apparatus of claim 29, wherein:
the clock is configured to insert, in the synchronization burst, a system frame number.

31. The apparatus of claim 29, wherein:
the clock is configured to insert, in the synchronization burst, an error detection code.

32. The apparatus of claim 19, wherein:
the clock is configured to generate for the frame synchronization information a frame clock.

33. The apparatus of claim 19, wherein the processors for at least one air interface standard comprise a radio frequency transceiver and a base band processor.

34. The apparatus of claim 19, wherein the processors for at least one air interface standard comprise radio frequency transceiver blocks and base band processing blocks, and the radio frequency transceiver blocks and the base band processing blocks are included in at least one special unit of a base station.

35. The apparatus of claim 19, wherein processors of two different air interface standards are included in one multi-standard unit of a base station.

36. An apparatus, comprising:
a clock configured to generate frame synchronization information for at least two air interface standards, wherein the clock is further configured to generate for the frame synchronization information a frame clock and to generate a system frame number for the frame synchronization information;
processors of different air interface standards, at least one of the processors configured to extract the frame synchronization information from a received synchronization burst of a respective air interface standard and to change the frame number at a predetermined offset to a predetermined point of the received synchronization burst; and
a serial bus configured to connect the clock and the processor, and also configured to transfer the synchronization burst containing the frame synchronization information from the clock to the processor using time-division multiplexing for the synchronization burst addressed to the processors of different air interface standards,
the clock is configured to distribute to the processor a system clock that is phase-locked with the frame clock; and
the processor is configured to sample the serial bus with a sampling rate derived from the system clock,
wherein the clock, the processors, and the serial bus are located in a base station.

37. A system, comprising:
a generator configured to generate frame synchronization information for at least two air interface standards in a clock, to generate a system frame number for the frame synchronization information;
a transmitter configured to transfer synchronization bursts containing the frame synchronization information from the clock to processors over a serial bus using time-division multiplexing for synchronization bursts addressed to processors of different air interface standards; and
an extractor configured to extract, in at least one processor, the frame synchronization information from a received synchronization burst of a respective air interface standard and to change the frame number at a predetermined offset to a predetermined point of the received synchronization burst,
wherein the generator, the transmitter, and the extractor are located in a base station.

38. The system of claim 37, further comprising:
a utilizing unit configured to utilize extracted frame synchronization information for air interface frame synchronization between different processors of at least one air interface standard.

39. The system of claim 37, further comprising:
a utilizing unit configured to utilize the extracted frame synchronization information for bus synchronization between different processors of at least one air interface standard.

40. The system of claim 37, further comprising:
a generator configured to generate in the at least one processor independent synchronization information locked to the extracted synchronization information.

41. An apparatus, comprising:
a clock generating means for generating frame synchronization information for at least two air interface standards and for generating a system frame number for the frame synchronization information;
a plurality of processing means of different air interface standards, at least one of the processing means for extracting the frame synchronization information from a received synchronization burst of a respective air interface standard and for changing the frame number at a predetermined offset to a predetermined point of the received synchronization burst; and
a serial bus means for connecting the clock generating means and the plurality of processing means, and for transferring the synchronization burst containing the frame synchronization information from the clock generating means to the plurality of processing means using time-division multiplexing for the synchronization burst addressed to the plurality of processing means of different air interface standards,
wherein the clock generating means, the plurality of processing means, and the serial bus means are located in a base station.

42. A computer program embodied on a computer-readable medium, the computer program configured to control a processor to perform operations comprising:
generating frame synchronization information for at least two air interface standards in a clock;
generating a system frame number for the frame synchronization information;
transferring synchronization bursts containing the frame synchronization information from the clock to processors over a serial bus using time-division multiplexing for synchronization bursts addressed to processors of different air interface standards;
extracting, in at least one processor, the frame synchronization information from a received synchronization burst of a respective air interface; and
changing, in the at least one processor, the frame number at a predetermined offset to a predetermined point of the received synchronization burst,
wherein the generating of the frame synchronization information, the generating of the system frame number, the transferring of the synchronization bursts, and the extracting of the frame synchronization information are performed in a base station.

* * * * *

UNITED STATES PATENT AND TRADEMARK OFFICE
CERTIFICATE OF CORRECTION

| | | |
|---|---|---|
| PATENT NO. | : 7,602,763 B2 | Page 1 of 1 |
| APPLICATION NO. | : 10/441250 | |
| DATED | : October 13, 2009 | |
| INVENTOR(S) | : Pekka Adolfsen and John Beale | |

It is certified that error appears in the above-identified patent and that said Letters Patent is hereby corrected as shown below:

Title page, item [54] and col. 1 should read as follows:

APPARATUS AND METHOD FOR DISTRIBUTING FRAME SYNCHRONIZATION INFORMATION AT A BASE STATION

Signed and Sealed this

Twentieth Day of April, 2010

David J. Kappos
*Director of the United States Patent and Trademark Office*